United States Patent [19]
Haber

[11] Patent Number: 5,278,548
[45] Date of Patent: Jan. 11, 1994

[54] BUFFERED FEEDTHROUGH CROSSBAR SWITCH

[75] Inventor: William J. Haber, Tempe, Ariz.

[73] Assignee: The United States of America as represented by the Secretary of the Navy, Washington, D.C.

[21] Appl. No.: 685,588

[22] Filed: Apr. 11, 1991

[51] Int. Cl.[5] ............................................. H04Q 11/00
[52] U.S. Cl. .................................. 340/825.79; 370/53; 370/112
[58] Field of Search ................. 370/53, 56, 57, 58.1-; 340/825.79, 825.8, 825.83, 825.85, 825.89, 825.9, 825.91; 379/242, 271, 291-

[56] References Cited

U.S. PATENT DOCUMENTS

| | | | |
|---|---|---|---|
| 3,833,866 | 9/1974 | Boutelant | 340/825.79 |
| 4,038,638 | 7/1977 | Hwang | 340/825.8 |
| 4,599,721 | 7/1986 | Murray | 370/112 |
| 4,633,386 | 12/1986 | Terepin | 395/325 |
| 4,677,436 | 6/1987 | Burlingame et al. | 340/825.8 |
| 4,725,835 | 2/1988 | Schreiner et al. | 340/825.83 |
| 4,811,210 | 3/1989 | McAulay | 395/325 |
| 4,818,988 | 4/1989 | Cooperman et al. | 340/825.91 |
| 4,926,423 | 5/1990 | Zukowski | 370/112 |
| 5,016,245 | 5/1991 | Lobjinski et al. | 370/60 |

Primary Examiner—Wellington Chin
Assistant Examiner—Hassan Kizou
Attorney, Agent, or Firm—Harvey Fendelman; Thomas Glenn Keough; Robert D. Harder

[57] ABSTRACT

An improved crossbar switch in which internal buffering is performed for all input signals across the chip and in which an extra input for each output channel of the crossbar switch element is provided.

2 Claims, 5 Drawing Sheets

BUFFERED FEEDTHROUGH CROSSBAR SWITCH

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

A major problem in high speed circuits, either digital or analog, is that the loading of the signals off chip is much greater than the loading on chip. This loading is caused in a large part by the capacity of the interconnection wires, cables, or printed circuit tracks and results in reduced bandwidth or the need for more powerful drivers. This bandwidth reduction becomes more severe as the distance the signal must go increases. In a multilevel switching network for a large switching array, minimizing the interconnection distances between widely spaced chips is a major difficulty. A reduction of the distance between chips or a reduction in the number of chips that must be interconnected, makes the network easier to construct and the overall data rate through the network higher.

SUMMARY OF THE INVENTION

The present invention is directed to reducing the complexity of the interconnection architecture of high-speed crossbar switching networks by providing a simplified method for interconnecting basic crossbar switch elements used in large-scale switching systems. Many multilevel networks require that an individual chip must communicate with practically every other chip in the network. In accordance with the present invention a large scale switching network can be constructed of Buffered Feedthrough Crossbar Switch (BFCS elements in an architecture which requires that each BFCS element interconnects with only the BFCS elements adjacent to it. This is possible because each BFCS element can function as either a crossbar switch or as a buffered feedthrough path to the next BFCS switch element. This is accomplished by the present invention by a basic crossbar switch element which is capable of buffering each signal input to provide a buffered input to the switch element multiplexer array and which also provides a buffered feedthrough of the input signal to a separate output terminal of the switch element. The BFCS element of this invention also has the ability to bypass the BFCS multiplexer array and connect separate feedthrough inputs to each of the output terminals of the switch element. As a result, an architecture can be designed to interconnect a network so that the signal lines required are very short, maximum bandwidth is greater and the overall network is much easier to package.

There are 3 basic differences between the BFCS switch element and the traditional crossbar switch element. These differences are: (1) the addition of a buffered data output for each of the data inputs, (2) the addition of a feedthrough input for each of the data outputs, and (3) additional switching capability to enable the connection of the feedthrough inputs to the data outputs. Each separate feedthrough input can be connected (by a switch address command) to one and only one particular data output.

The buffered data outputs from the BFCS eliminate the system problem of a central buffering and fanout point for the various signals. Each BFCS switch element buffers the data for its neighbor downstream. This local buffering eliminates potential timing problems introduced by variable lengths of coax or circuit tract for high-speed data signals to different parts of the system. The buffered data output (and clock for synchronous operation) from one BFCS is available to drive a feedthrough input of a neighboring BFCS switch element.

The feedthrough input on each data output channel of the BFCS switch element can be used to facilitate switch network expansion. Each feedthrough input can be programmed by an address command to bypass the multiplexer array and connect that feedthrough input directly to one and only one particular data output.

The present invention has applications in many areas.

Applied to a digital system, there are many new computer architectures and data handling systems which are being developed which use large data switches. These switches improve overall system operation in several ways. Greater parallelism can be achieved by making system data paths flexible and readily changed. System architecture flexibility and reconfigurability can be obtained by using the BFCS switch to connect different system elements (processors, memory modules, and peripherals) in different configurations at different times. These configurations are chosen based on time-dependent system task loading.

Analog systems may benefit from this architecture in a similar manner. The buffering within each BFCS switch element lowers load capacity, raising the bandwidth. This makes possible large wideband signal switching systems. An example system might have a number of array detector groups switched between one set of processing electronics. For example, large sonar systems could benefit from this technology.

The addition of buffering to allow the easy expansion of the number of outputs, along with the addition of an extra input per channel for vertical expansion (number of inputs) has produced the improvement.

There are various other crossbar switch elements available to construct large switching arrays. None of these, however, are self-buffering by design, nor do they interconnect in a regular array, regardless of size, as does this design.

The architecture of a crossbar switch network constructed with BFCS switch elements builds smoothly in size by increasing the row and column elements, because each element only needs to interconnect with the adjacent switching elements. This is possible because each of the BFCS switch elements can function either as a switch matrix or a buffered feed through path to the next element of the network. This approach is superior for high-speed switching since the physical difficulties of making the interconnections are all but eliminated. Full non-blocking and broadcast performance is maintained as well. While this approach requires increased numbers of individual crosspoints, with the advent of integrated switching elements, this is only of minimal inconvenience and is a trade-off which is logically made to gain high-speed performance.

OBJECTS OF THE INVENTION

An object of the invention is to provide a basic crossbar switch element which buffers each data input to furnish a buffered data input to the crossbar switch element multiplexer array and a buffered feedthrough of the input data to a separate buffered data output terminal of the switch element.

Another object of the invention is to provide a basic switch element which has a separate addressable feedthrough input for each data output channel. This allows cascading data from the buffered data output of another crossbar switch element through that output channel.

These and other objects of the invention will become more readily apparent from the ensuing specification when taken in conjunction with the drawings and appended claims.

DESCRIPTION OF THE PREFERRED EMBODIMENT

Figure 1:
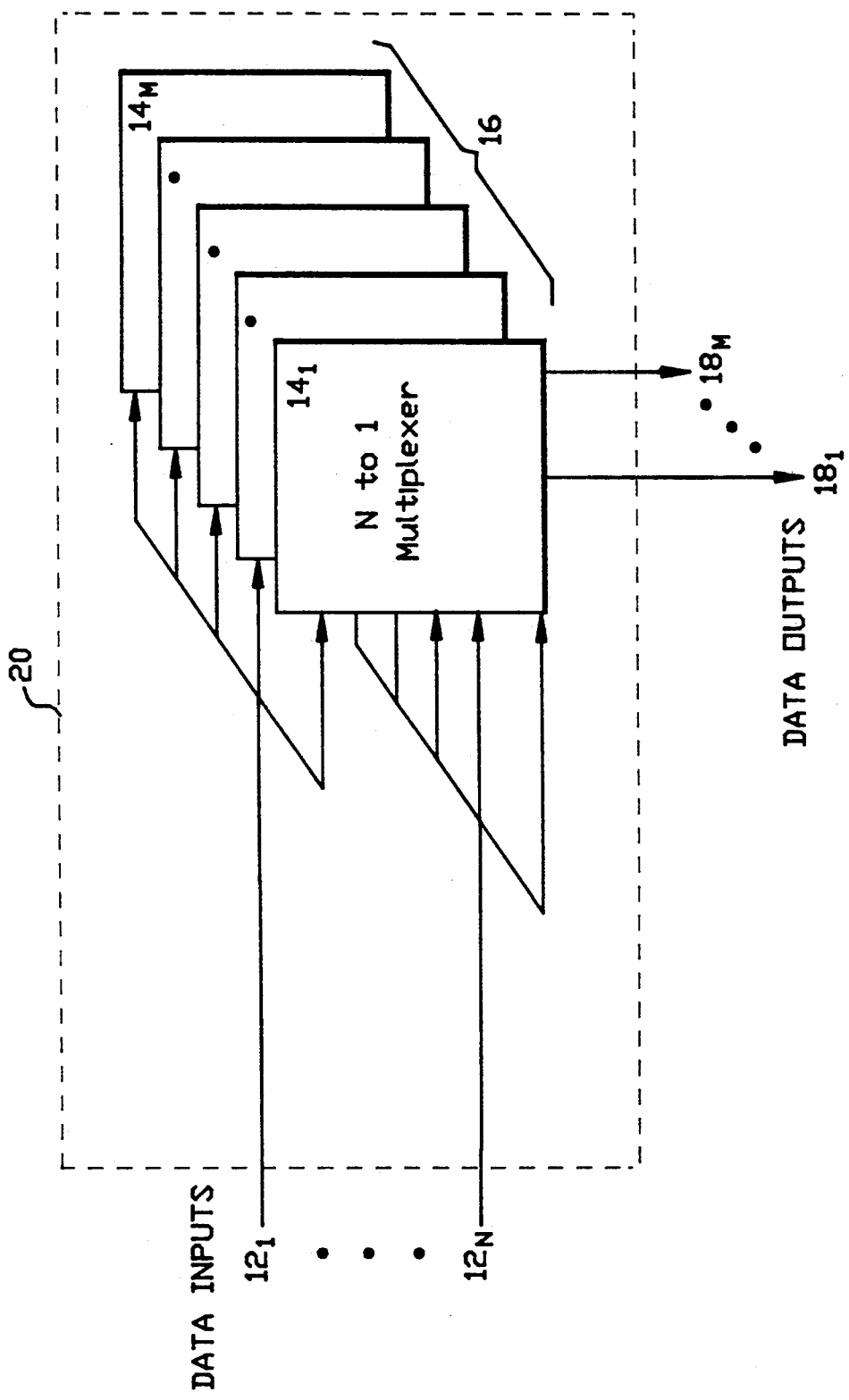
FIG. 1 is a functional diagram of a prior art $N \times M$ crossbar switch element.

Referring now to the drawings, wherein like reference numerals designate like or similar parts throughout the several views, there is illustrated in FIG. 1 a diagram of a prior art crossbar switch element. To make the FIG. 1 crossbar operate, a control section (not shown) must be employed which would process the necessary address data and clock signals related to the existing crossbar interconnect assignment of the switch and which is capable of altering that assignment in response to address data changes. This control section is not illustrated because it relates only peripherally to the subject matter of this invention, and it is believed that inclusion thereof would unnecessarily complicate this description.

For similar reasons, control inputs are not illustrated in FIGS. 2, 3, 4, 5, & 6 which diagram the BFCS switch element, multiplexers, and network interconnections.

Figure 5:
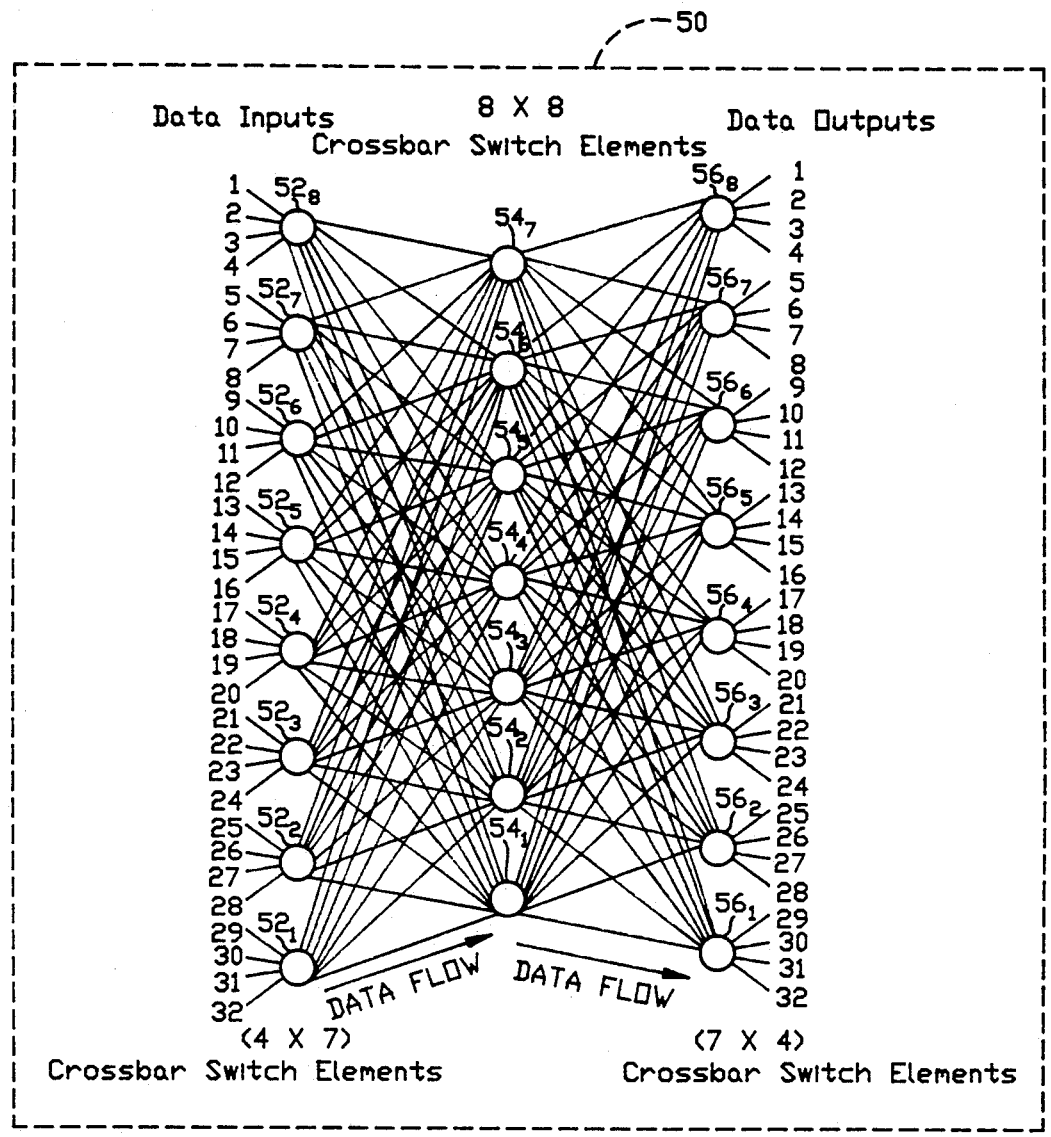
FIG. 5 is a diagram of the interconnection of a multilevel crossbar switch network constructed with prior art crossbar switch elements.
Figure 6:
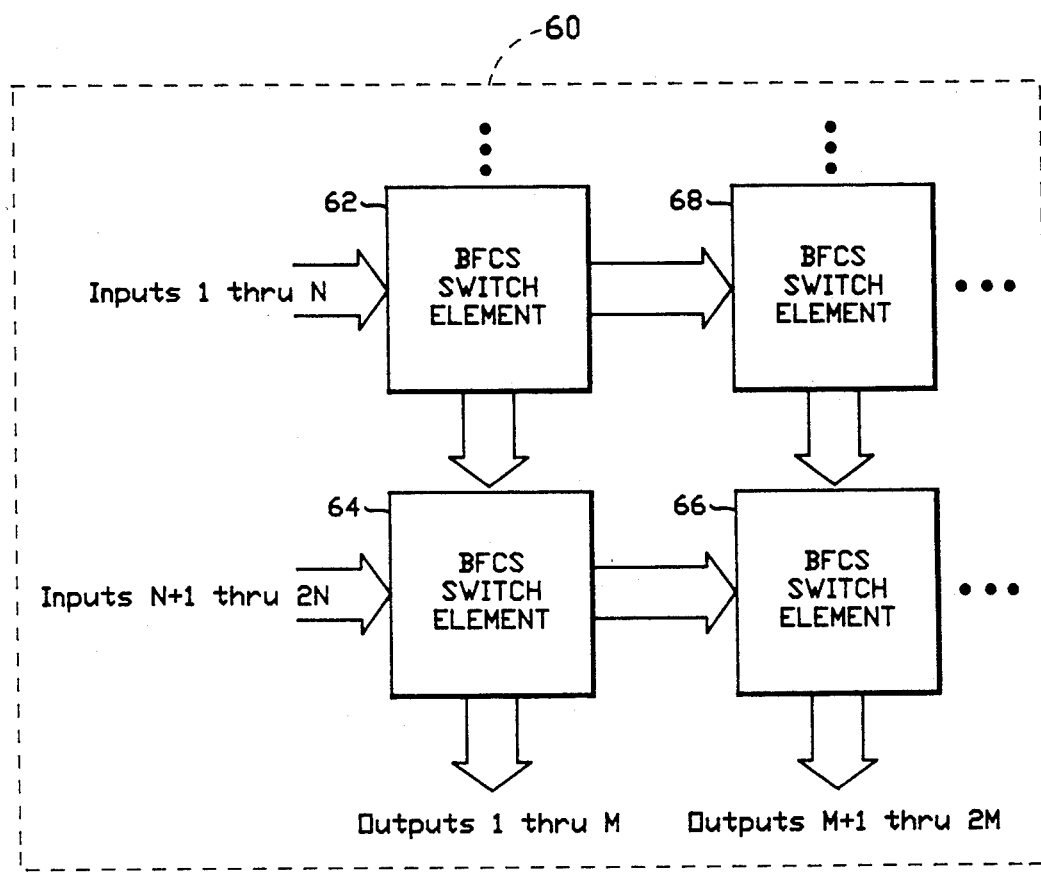
FIG. 6 is a diagram of the interconnection of a multilevel crossbar switch network constructed with BFCS switch elements.

Although crossbar switch control is not an object of this invention, there is a substantial difference in complexity between controlling the two networks shown in FIGS. 5 & 6. This is because the complexity of routing through the network of FIG. 5 is much greater than that of FIG. 6. There is only one path through the network of FIG. 6 for a given I/O connection. There are many paths for a given I/O connection through the network of FIG. 5 and these will change depending on the routing the of other I/O connections.

The traditional crossbar switch element 10, illustrated in FIG. 1, is created from one or more N to 1 multiplexers $14_1 \ldots 14_M$ used in an array 16 of size M. Each of the data inputs $12_1 \ldots 12_M$ is fanned out to all of the M multiplexers $14_1 \ldots 14_M$ in the array. Each multiplexer $14_1 \ldots 14_M$ has one data output $18_1 \ldots 18_M$. The number of connections (crosspoints) required for this approach is $N \times M$.

This invention is a modification of the traditional crossbar switch element 10 (shown in FIG. 1). This modification is made to make interconnection between switch elements easier.

Figure 2:
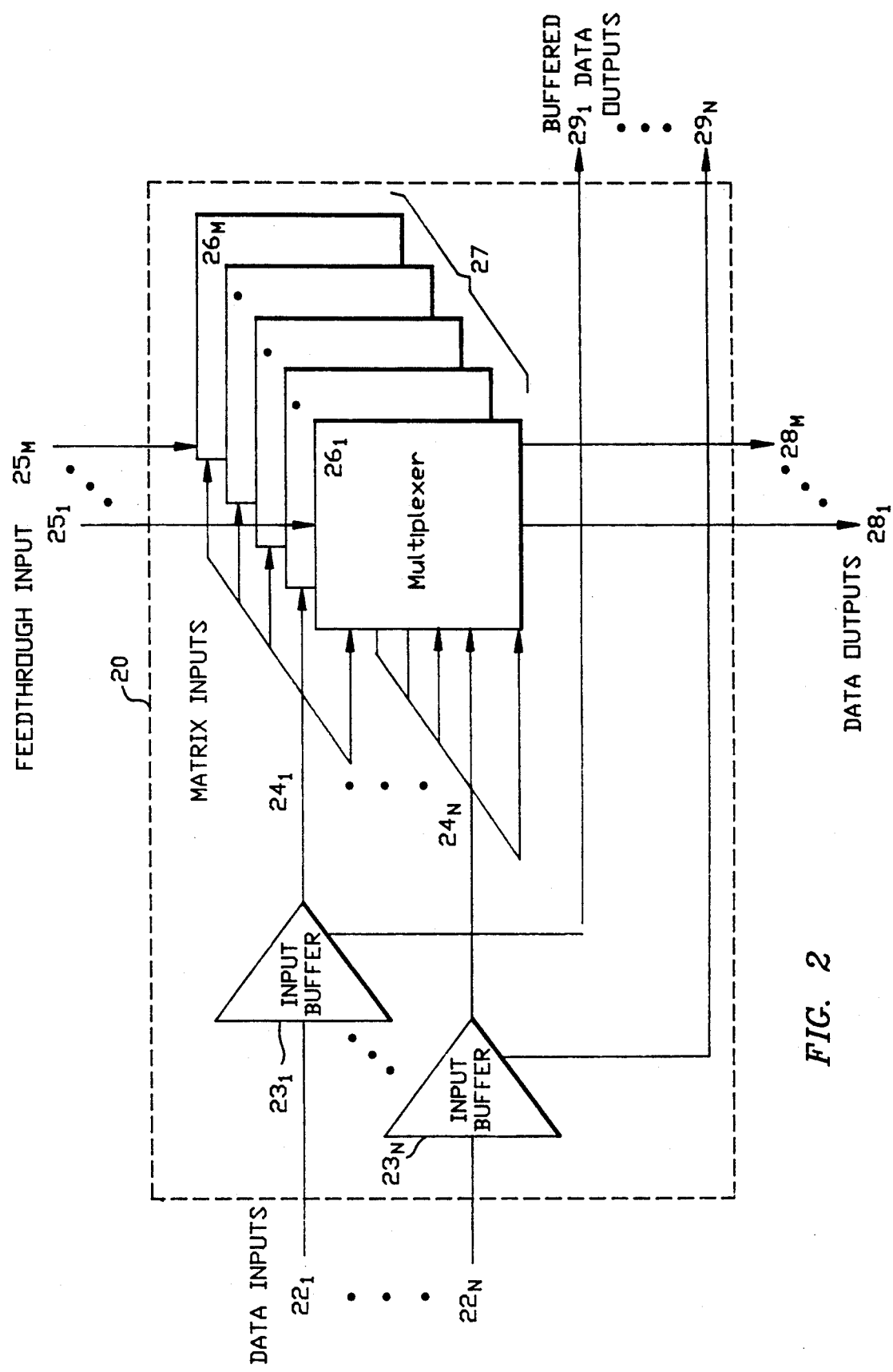
FIG. 2 is a functional diagram of a BFCS $N \times M$ crossbar switch element.

The BFCS switch element 20, illustrated in FIG. 2, is similar in structure to the traditional switch. It contains one or more multiplexers $26_1 \ldots 26_M$ in an array 27 of size M. Each of the data inputs $22_1 \ldots 22_M$ is connected to an input buffer $23_1 \ldots 23_M$ that fans out the data to all of the multiplexer matrix inputs $24_1 \ldots 24_M$. However, each input buffer $23_1 \ldots 23_M$ has a additional output $29_1 \ldots 29_M$, which is connected to a buffered data output terminal of the switch. Each multiplexer $26_1 \ldots 26_M$ has one data output $28_1 \ldots 28_M$. In addition, each multiplexer $26_1 \ldots 26_M$ has a feedthrough input $25_1 \ldots 25_M$ which is connected to a feedthrough input terminal on the BFCS. Each feedthrough input $25_1 \ldots 25_M$ is not fanned out, it is only connected to a single multiplexer $26_1 \ldots 26_M$ in the array. As an example, feedthrough input $25_1$ is only connected to multiplexer $26_1$ and can only be connected to one data output $28_1$. These feedthrough inputs $25_1 \ldots 25_M$ can be used to cascade data from additional BFCS elements for switch expandability.

Figure 4:
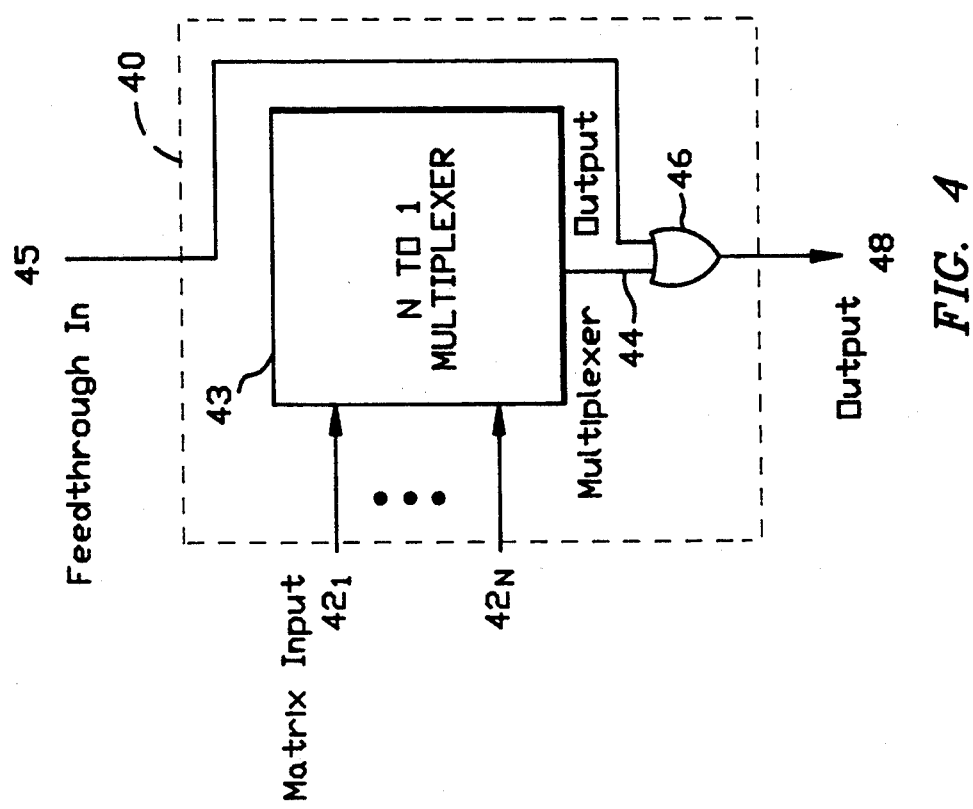
FIG. 4 is a diagram of a multiplexer with hardwired feedthrough.
Figure 3:
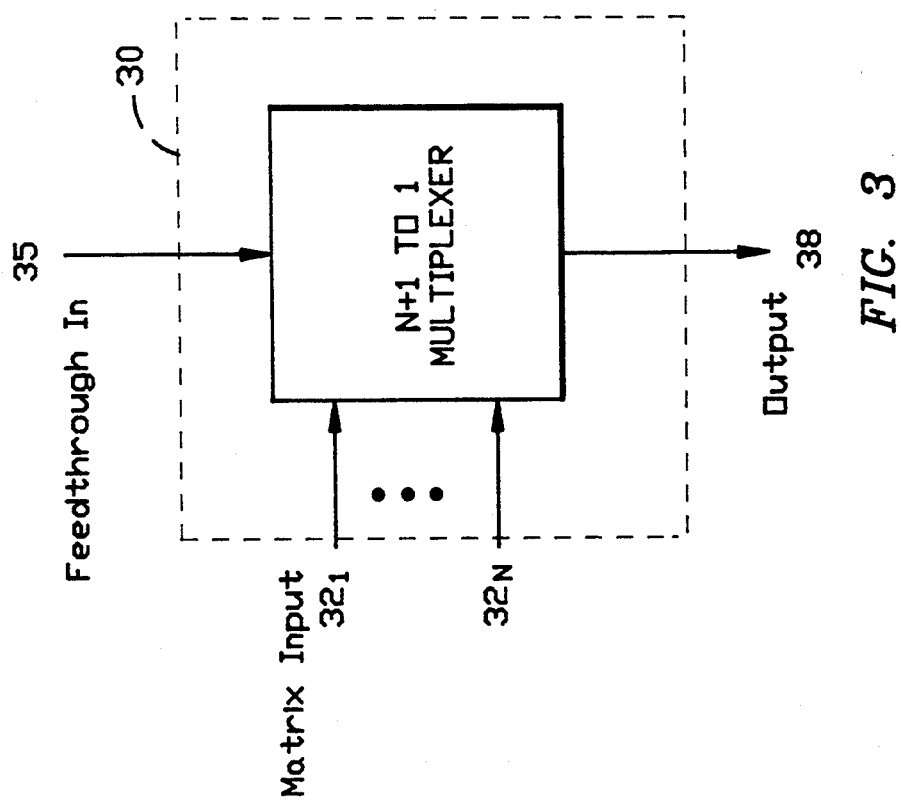
FIG. 3 is a diagram of a multiplexer with addressable feedthrough.

Multiplexer array 27 (as shown in FIG. 2) is composed of multiplexers $26_1, \ldots 26_M$ each of which can be either an N+1 to 1 multiplexer 30 with addressable feedthrough input 35 as shown in FIG. 3, or an N to 1 multiplexer 43 with a hardwired feedthrough 45 a shown in FIG. 4.

When multiplexer 30 (FIG. 3) is used in the BFCS 2 (FIG. 2), the size of each multiplexer can be thought of as having increased to N+1 to 1 from the previous N to 1 multiplexer of the traditional crossbar switch element 10 (FIG. 1). The additional input of the multiplexer 30 is not used as a matrix input $32_1 \ldots 32_N$, but instead is connected to an external feedthrough input 35. The feedthrough input 35 is never connected to any other multiplexer in the multiplexer array 27 (FIG. 2). Therefore, the only output which can be connected to the feedthrough input is the output 38 of the individual multiplexer 30 it is connected to. The number of crosspoints required for an $N \times M$ crossbar switch is increased to (N+1) times M.

In accordance with the present invention an alternate approach to increasing the size of a traditional crossbar switch multiplexer to N+1 to 1 (FIG. 3) is the addition a hardwired feedthrough capability 40 (FIG. 4) in the form of an OR-gate 46 at the output 44 of the N to 1 multiplexer 43 to add the feedthrough input 45. The circuitry required to add the OR-gate 46 is somewhat simpler but requires that the multiplexer 43 be in the off ("logic 0") state to allow the feedthrough signal to pass. Similarly, the feedthrough input 45 must be off to allow the multiplexed signal to pass. Depending on the ease of achieving the off state in the particular hardware implementation, this approach may be more desirable than the N+1 to 1 multiplexer 30 (FIG. 3).

The feedthrough input on each output channel of the BFCS is available to accept a buffed data output from an adjacent BFCS switch element.

As an example of the operation of a BFCS crossbar switch element, data input into BFCS 20 (FIG. 2) enters the switch through input $22_1$ into buffer $23_1$ which fans the data out to the matrix inputs $24_1 \ldots 24_M$ of the multiplexer array 27. This allows the data to enter all the crossbar multiplexers $26_1 \ldots 26_M$ in the matrix 27, so that the data can be routed by the proper address signals to data outputs $28_1$ through $28_M$. Another output from buffer $23_1$ connects the data to buffered data output $29_1$.

Multiplexer 26₁ also has feedthrough input 25₁, which can be connected by the proper address signal to data output 28₁, thus bypassing the multiplexer array 27. As a result the BFCS element can be used either as a crossbar switch or as a buffered data feed through path when it is utilized in a complex switch network.

FIG. 5 is a diagram of a prior art multilevel crossbar switch network 50 which depicts the interconnection of eight 4×7 crossbar switch elements 52₁,... 52₈, with seven 8×8 crossbar switch elements 54₁,... 54₇, and eight 7×4 crossbar switch elements 56₁,... 56₈. This is an example of the diverse interconnection paths necessary for a 32×32 crossbar network which utilizes prior art 4×7, 8×8, and 7×4 crossbar switch elements.

FIG. 6 is a diagram of multilevel crossbar switch network constructed from crossbar switch elements which are the subject of this invention. A comparison of FIG. 5. with FIG. 6. will show that a complex crossbar network 60 constructed with BFCS switch elements 62 ... 64 can be designed to have shorter, more uniform interconnection lengths and data paths than complex switch network 50 constructed of prior art crossbar switch elements.

Properly implemented. the architecture of FIG. 6 will allow for an unlimited expansion of a crossbar switch system in both number of inputs and outputs.

There are two improvements offered by the architectural approach of FIG. 6.

The first is the easy expandability of a switching network by only adding more BFCS switch elements. Traditional prior art networks have required the addition of various kinds of buffering networks and irregular sized switching elements. Often switch network elements have been very difficult to connect together due to the tangled interconnection paths required (as shown in FIG. 5.). The BFCS switch element allows large scale switching systems to be designed with uniform interconnection patterns (as shown in FIG. 6.). If the switch elements are laid out with the architecture of FIG. 6. in mind, they may be wired directly from pin to pin of the adjacent BFCS packages. This allows the interconnection paths between switch elements to be shorter and more uniform in length than they would be if the network were constructed using prior art switch elements.

The second advantage is increased network speed due to reduced loading of the output buffers. The short, regular connections, reduce capacity and in many cases, coax cable may be eliminated from the circuits. This reduces drive requirements and makes the signal buffers within the BFCS elements smaller and easier to build. In many situations overall system power is reduced.

Obviously, many modifications and variations of the present invention are possible in the light of the above teachings. It is therefore to be understood that within the scope of the appended claims the invention may be practiced otherwise than as specifically described.

I claim:

1. An N×M crossbar switch, where N and M are positive integers comprising:

N data inputs, N data input buffers, N buffered data outputs, M feedthrough inputs, M data outputs, and an array of M multiplexers, each multiplexer having N matrix inputs;

each of said data inputs being connected to one of said input buffers, each of said input buffers having an output connected to one of said matrix inputs to each of said multiplexers;

each of said input buffers having a separate output connected to one and only one of said buffered data outputs;

each of said data inputs being addressably connected through said multiplexer array to each of said data outputs; and each of said feedthrough inputs being addressably connected to one and only one of said data outputs, said crossbar switch further comprising:

M OR-gates, each OR-gate having a first input and a second input;

the output of each of said multiplexers being connected to the first input of one of said OR-gates;

each of said feedthrough inputs being connected to the second input of one of said OR-gates; and the output of each of said OR-gates being connected to one of said data outputs.

2. A plurality of the switches in claim 1 interconnected to construct a crossbar switch network.

* * * * *